United States Patent
Gahler

(10) Patent No.: US 10,018,498 B2
(45) Date of Patent: Jul. 10, 2018

(54) SCALES WITH A FOLDABLE WEIGHING TABLE

(71) Applicant: GEA Food Solutions Germany GmbH, Biedenkopf-Wallau (DE)

(72) Inventor: Thomas Gahler, Dachsteinweg (DE)

(73) Assignee: GEA FOOD SOLUTIONS GERMANY GMBH, Biedenkopf-Wallau (DE)

( * ) Notice: Subject to any disclaimer, the term of this patent is extended or adjusted under 35 U.S.C. 154(b) by 151 days.

(21) Appl. No.: 15/031,844

(22) PCT Filed: Nov. 6, 2014

(86) PCT No.: PCT/EP2014/073928
§ 371 (c)(1),
(2) Date: Apr. 25, 2016

(87) PCT Pub. No.: WO2015/067693
PCT Pub. Date: May 14, 2015

(65) Prior Publication Data
US 2016/0265961 A1    Sep. 15, 2016

(30) Foreign Application Priority Data
Nov. 8, 2013 (DE) .................. 10 2013 222 694

(51) Int. Cl.
*G01G 11/00* (2006.01)
*G01G 21/23* (2006.01)
(Continued)

(52) U.S. Cl.
CPC ........... *G01G 21/28* (2013.01); *G01G 11/003* (2013.01); *G01G 17/00* (2013.01); *G01G 21/23* (2013.01); *B65G 21/06* (2013.01)

(58) Field of Classification Search
CPC ........ G01G 17/00; G01G 21/23; G01G 21/28; G01G 11/00; G01G 11/003; B65G 21/06
See application file for complete search history.

(56) References Cited

U.S. PATENT DOCUMENTS 3,752,298 A * 8/1973 Wenger .................. B65G 21/06
  198/816
3,869,007 A * 3/1975 Haggstrom .......... G01G 3/1408
  177/119
(Continued)

FOREIGN PATENT DOCUMENTS

DE    2356671 A1 * 5/1974 .......... G01G 3/1408
DE    10038443 A1    2/2002
(Continued)

OTHER PUBLICATIONS

Computer translation of DE 10038443, Mar. 23, 2018.*
(Continued)

*Primary Examiner* — Randy Gibson
(74) *Attorney, Agent, or Firm* — The Dobrusin Law Firm, P.C.

(57) ABSTRACT

A set of scales having a rack on which at least one, preferably a plurality of weighing tables is/are provided which has/have in each case one frame. The frame of at least one weighing table is provided so as to be at least partially pivotable and/or rotatable in relation to the rack such that the frame is convertible from a use position to a cleaning position and vice-versa.

20 Claims, 2 Drawing Sheets

(51) Int. Cl.
  *G01G 21/28* (2006.01)
  *G01G 17/00* (2006.01)
  *B65G 21/06* (2006.01)

(56) References Cited

U.S. PATENT DOCUMENTS

| | | | | |
|---|---|---|---|---|
| 4,570,729 | A | 2/1986 | Del Rosso | |
| 5,022,514 | A * | 6/1991 | Lofberg | B65G 15/00 |
| | | | | 198/813 |
| 5,152,355 | A * | 10/1992 | Copus | G01G 19/52 |
| | | | | 177/128 |
| 5,205,400 | A | 4/1993 | Breuss et al. | |
| 5,304,745 | A * | 4/1994 | Rusk | B07C 5/16 |
| | | | | 177/128 |
| 6,407,348 | B1 * | 6/2002 | Scott | B65G 21/10 |
| | | | | 14/70 |
| 6,509,533 | B1 * | 1/2003 | Tanaka | B65G 15/00 |
| | | | | 177/126 |
| 6,693,244 | B2 * | 2/2004 | Johnson | G01G 11/003 |
| | | | | 177/126 |
| 6,803,529 | B2 * | 10/2004 | Takahashi | B65G 15/00 |
| | | | | 177/119 |
| 6,958,452 | B2 * | 10/2005 | Takahashi | B65G 15/00 |
| | | | | 177/145 |
| 2005/0072603 | A1 | 4/2005 | Criscione, II et al. | |
| 2006/0252591 | A1 * | 11/2006 | Winkelmolen | B65G 21/06 |
| | | | | 474/153 |

FOREIGN PATENT DOCUMENTS

| | | |
|---|---|---|
| EP | 2343520 A1 | 7/2011 |
| FR | 2821833 A1 | 9/2002 |

OTHER PUBLICATIONS

Computer translation of EP 2343520, Mar. 23, 2018.*
International Search Report for Application No. PCT/EP2014/073928 dated Feb. 5, 2015.
International Preliminary Report on Patentability for International Application No. PCT/EP2014/073928 dated Jan. 26, 2016.

* cited by examiner

SCALES WITH A FOLDABLE WEIGHING TABLE

FIELD

The present invention relates to a set of scales having a rack on which at least one preferably a plurality of weighing tables which is/are in each case provided with a frame is/are provided.

BACKGROUND

Sets of scales of this type are well known from the prior art, for example from DE 2 356 671. It is also known for sets of scales having a plurality of weighing tables to be provided downstream of multi-track slicing devices, for example, wherein preferably one weighing table is then assigned to each track of the slicing device. However, these weighing tables may be cleaned only with comparative complexity, so that cleaning is rarely and/or insufficiently performed.

SUMMARY

It was thus the object of the present invention to provide a set of scales which does not have the disadvantages of the prior art.

The object is achieved by a set of scales having a rack on which at least one, preferably a plurality of weighing tables is/are provided, which has/have in each case one frame, wherein the frame of at least one weighing table is provided so as to be at least partially pivotable and/or rotatable in relation to the rack, such that the frame is convertible from a use position to a cleaning position and vice-versa.

The present invention relates to a set of scales, in particular for foodstuffs, in particular for sliced foodstuffs, which preferably contain protein. The foodstuffs are in particular sausage, cheese, or ham. The set of scales has a rack on which at least one, typically a plurality of weighing tables is/are disposed. The weighing tables are preferably disposed so as to be mutually parallel. The number of the weighing tables preferably corresponds to at least the number of tracks of a foodstuff processing device, in particular a slicing device, that is provided upstream. Each weighing table may determine the weight of the product, for example of the foodstuff portion which is composed of one or a plurality of foodstuff slices, in a manner independent of the other weighing tables. Determining the weight typically is performed while the product is moving in relation to the respective weighing table. Each weighing table has one frame. According to the invention, the frame of at least one weighing table is provided so as to be now partially pivotable and/or rotatable in relation to the rack, such that the frame is convertible from a use position to a cleaning position and vice-versa. In the use position, the surface of the weighing table on which the product to be weighed is located, is preferably oriented so as to be horizontal and is particularly preferably aligned with conveying means which are located upstream and/or downstream of the weighing table. At least one measuring cell which interacts directly or indirectly with the weighing table, in particular with the pivotable and/or rotatable part of the weighing table and, on account thereof, determines the weight of the product which is located on the weighing table is preferably located in the region of each weighing table. In the cleaning position the pivotable and/or rotatable part of the frame is then located in a position which is angular, preferably rectangular in relation to the horizontal. In the cleaning position both the weighing table as well as the rack of the set of scales are readily accessible and, on account thereof, very easy to clean, in the cleaning position of the frame an endless belt which is optionally provided on the frame of the weighing table may be removed from said frame and cleaned.

Preferably, the frame in relation to the rack of the set of scales has a fixed portion and a pivotable and/or rotatable portion. The two portions are preferably interconnected by way of a rotating and/or pivoting, mounting, such that the rotatable and/or pivotable portion may be moved in relation to the fixed portion. This rotating and/or pivoting mounting may be connected to the rack of the set of scales. Both portions have a length which in each case is the extent of the former in the conveying direction. Preferably, the pivotable portion has a greater length than the fixed portion.

Preferably, a spacing in a manner transverse to the conveying direction of the conveyor belts, in particular of the endless belts, is provided between two adjacent frames. Preferably, the fixed portions of two opposite, in particular offset, frames are provided such that a continuous spacing is provided between the mutually facing ends of said fixed portions. One or more spacings may serve for cleaning the device and/or for removing the conveyor belts.

Preferably, the weighing table is provided such that the former may completely and/or partially be reversibly removed from the rack of the set of scales.

According to one preferred embodiment of the present invention, the frame of each weighing table is mounted in particular on the rack of the set of scales by way of one mounting or a plurality of mountings. At least one, preferably each, mounting here may be provided so as to be releasable from the rack. This mounting interacts or these mountings interact, preferably, with one or a plurality of measuring cells.

For the case in which a plurality of weighing tables are provided and these are particularly preferably provided so as to be mutually parallel, the mountings of adjacent weighing tables are preferably disposed so as to be mutually offset. This likewise improves/simplifies cleaning of the set of scales according to the invention for example.

Preferably, the pivoting and/or rotating directions of adjacent weighing tables from the use position to the cleaning position and vice-versa are in each case opposed. This preferred embodiment of the present invention also improves/simplifies cleaning of the set of scales according to the invention. Moreover, assembly/disassembly of a conveying means, in particular of as conveyor belt, which is optionally disposed on the frame is simplified by this preferred embodiment of the present invention.

According to one preferred embodiment of the present invention, a conveying means, in particular a conveyor belt, preferably an endless belt, is disposed on the frame. This conveying means is preferably driven and moves the product to be weighed along the weighing table. The weight of the product is preferably determined during the dwelling time of the product on the weighing table. Endless tapes of which preferably a plurality are provided per weighing table so as to be mutually parallel are also coming as a preferred conveying means.

Preferably, the frame in the use position thereof tensions the conveying means, in particular the conveyor belt. In the cleaning position of the frame the conveying means is preferably not tensioned and, on account thereof, may be readily removed from the frame, for example in order for the latter to be repaired, replaced, or cleaned.

Preferably, the frame at two sides which in relation to the running direction of the conveying means are mutually opposite has in each case one roller around which the conveying means, in particular the endless belt or the endless tape/tapes revolve. One of the rollers is preferably driven, wherein the drive motor is preferably located within the rack of the set of scales.

Preferably, the pivotable and/or rotatable portion of the frame in the use and/or cleaning position thereof is lockable, in particular without the use of tools, to the fixed portion of the frame or in relation to the rack.

A further subject matter of the present invention is a line for producing foodstuff, in particular sliced foodstuff portions, having the set of scales according to the invention.

Preferably, the line upstream of the set of scales has a slicing device by way at which a foodstuff block, is sliced into foodstuff slices.

An insertion unit which inserts the weighed products into an item of packaging is preferably provided downstream of the set of scales.

The signal from the set of scales is preferably used for controlling the slicing device.

The invention will be explained hereunder by means of FIGS. 1 to 3. These explanations are merely exemplary and do not limit the general concept of the invention.

DETAILED DESCRIPTION

Figure 1:
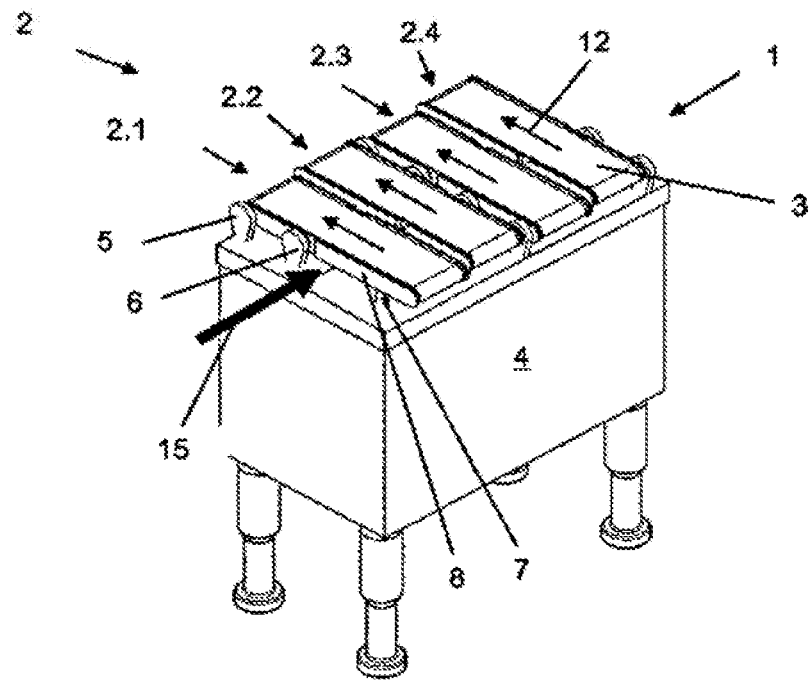
FIG. 1 shows the set of scales according to the invention, having the weighing tables in the use position.

FIG. 1 shows the set of scales 1 according to the invention, which has a rack 4, having a frame which is surrounded by a casing. Drives and/or the electronics of the set of scales may be located within the rack. The set of scales in the present case furthermore has four weighing tables 2 along which the product to be weighed, presently sliced foodstuffs, is conveyed and thereby weighed, as is illustrated by the arrow 12. Each weighing table can weigh in a manner completely independent of the other weighing tables, and the weight weighed in each case may be determined in a manner independent of the other weighing tables and be utilized for controlling the upstream slicing device and/or a downstream product separating unit and/or product completion unit. Each weighing table 2.1-2.4 is mounted on the rack by way of at least one mounting, presently two mountings 5, 6. The mountings 5, 6 of two adjacent weighing tables are preferably disposed so as to be mutually offset. In the present case, the mounting 5, 6 of a weighing table 2.1, 2.3 is located at the one end of the rack of the set of scales, and the mounting 5, 6 of the respectively adjacent weighing table 2.2, 2.4 is located at the opposite end of the weighing table. Each weighing table 2 has a frame 8 which in the present case at two mutually opposite ends is provided with in each case one roller 10, 11, of which here the roller 10 is driven (cf. FIG. 3). In order for the product to be weighed in each case to be conveyed along the weighing table and to be thereby weighed, a conveying means 3, presently an endless belt, revolves around the rollers 10, 11. The conveying means 3 is rotatingly driven by the roller 10. In order for the product which is in each case located on the weighing table to be weighed, one or a plurality of measuring cells which interacts or interact, respectively, with the respective weighing table is/are provided. The measuring cell is preferably not part of the frame. One support 7 is preferably provided for the pivotable part of each frame.

Figure 2:
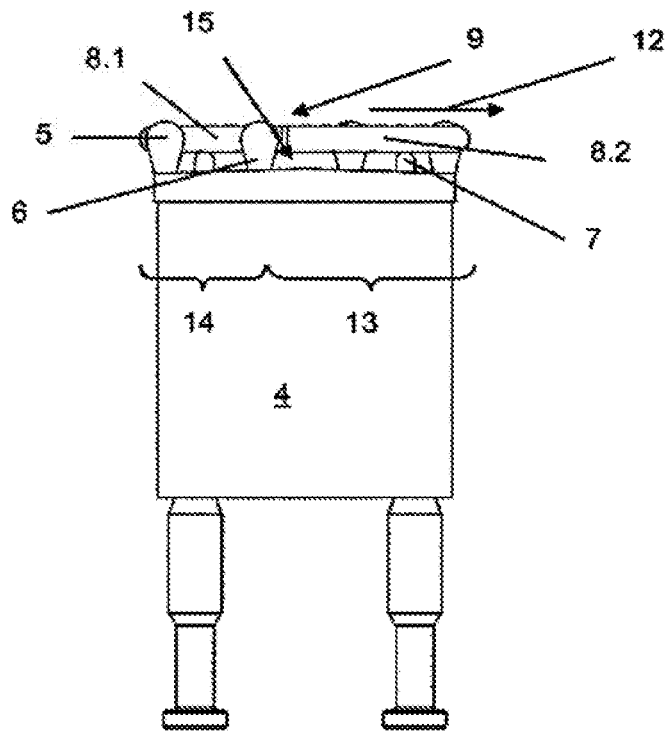
FIG. 2 shows a lateral view of the set of scales according to the invention, according to FIG. 1.

FIG. 2 shows a lateral view of the set of scales 1 according to FIG. 1. It can be clearly seen that the frame 8 of each weighing table is composed of a portion 8.1 which is fixed in relation to the rack 4 and in the present case is provided on the rack by means of the mountings 5, 6, and of a pivotable and/or rotatable portion 8.2. The portion 8.2 is mounted on the portion 8.1 by means of the pivot and/or rotation axis 9 on the portion 8.1 and/or on the rack 4. In the present case, the pivotable and/or rotatable portion 8.2 interacts with the measuring cell. It can be clearly seen that according to one preferred embodiment, the length 13 of the pivotable portion is longer than the length 14 of the fixed portion. The length here is in each case the extent of the respective portion in the conveying direction of the product. The mountings 5 and/or 6 are preferably connected directly or indirectly to the measuring cell.

Both FIGS. 1 and 2 in each case show the set of scales 1 having the weighing tables in the use position, that is to say in the position in which the weight of a product may be determined on each weighing table.

Figure 3:
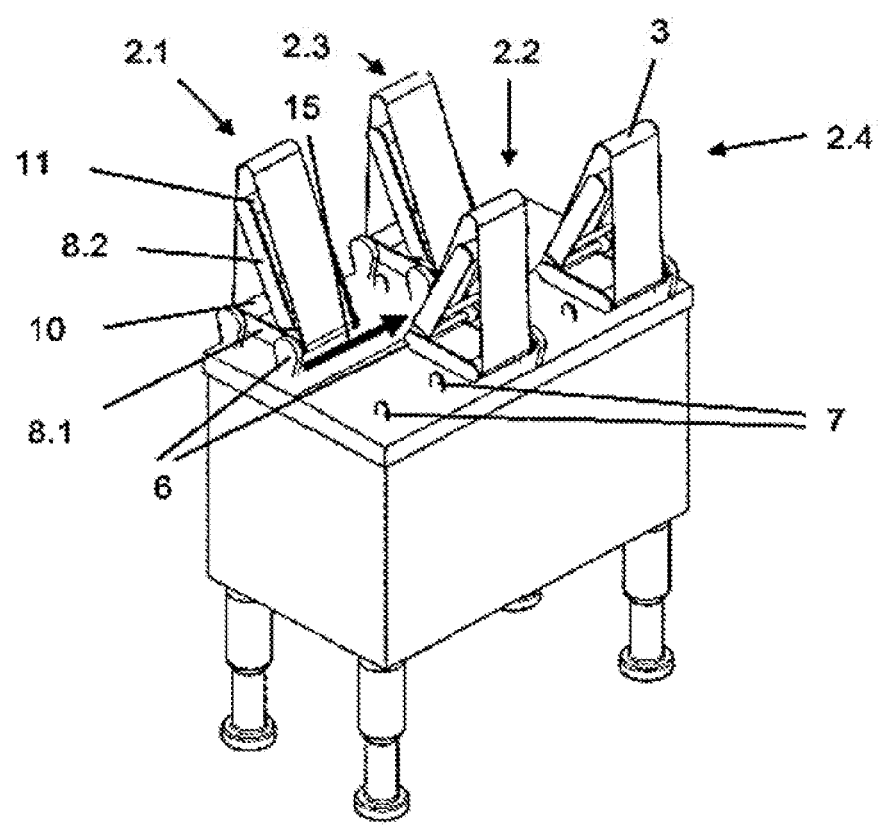
FIG. 3 shows the set of scales according to FIGS. 1 and 2, having the weighing tables in the cleaning position.

The set of scales 1 having all weighing tables 2.1-2.4 in the cleaning position is illustrated in FIG. 3. In this case, the pivotable and/or rotatable regions 8.2 are swiveled from the substantially horizontal use position of the former by a specific angle, presently at least 90°, about the axis 9 in relation to the fixed portion 8.1. However, the angle is preferably more than 90°, in order to ensure that the pivotable region remains in this position. On account thereof, the conveyor strap 4 is relaxed and may be removed from the frame 8 of the respective weighing table. The offset mounting 5, 6 of the respective weighing tables has the advantage that each weighing table 2.1-2.4 is readily accessible both from the right as well as from the left side thereof, so that the frames 8 and the rack 4 may be well cleaned and/or the conveyor belt 3 may be readily removed from the frame or be fastened thereto again, respectively. It can also be derived from the illustration according to FIG. 3 that the mounting 5, 6 is located on only one side of the frame 8. The conveyor strap may then be removed or assembled, respectively, by way of the opposite side. As soon as cleaning has been completed, the portions 8.2 are in each case converted from the cleaning position to the use position again, and the set of scales 1 is again ready for use. As can likewise be derived from FIG. 3, a continuous spacing which facilitates cleaning of the device, for example, is provided between the mutually facing ends, in particular between the mountings 6 of two mutually opposite frames. A spacing between the fixed portions is preferably also provided in a manner transverse to the conveying direction of the conveyor belts, so as to be able to readily remove the conveyor belts from the frame.

LIST OF REFERENCE SIGNS

1 Set of scales, multi-track scales
2 Weighing table
2.1-2.4 First to fourth weighing table
3 Conveyor belt, endless belt
4 Rack
5 First mounting
6 Second mounting
7 Support of pivotable portion
8 Frame of weighing, table
8.1 Fixed portion
8.2 Pivotable portion 9 Pivot and/or rotation axis
10 Driven roller
11 Freewheeling roller
12 Conveying direction of the products to be weighed
13 Length of the pivotable portion
14 Length of the fixed portion
15 Passage between fixed portions 8.1

The invention claimed is:

1. A set of scales comprising:
a rack on which a plurality of weighing tables are provided, each of the weighing tables have a frame,
wherein the frame of each of the weighing tables is provided so as to be at least partially pivotable and/or rotatable in relation to the rack such that the frame of each of the weighing tables is convertible from a use position to a cleaning position and vice-versa,
wherein the frame of each of the weighing tables is mounted on the rack by way of a mounting, and
wherein the mounting of adjacent weighing tables are disposed so as to be mutually offset so that the adjacent weighing tables pivot and/or rotate from the use position to the cleaning position and vice-versa in opposite directions relative to each other.

2. The set of scales of claim 1, wherein the frame of each of the weighing tables, in relation to the rack, has a fixed portion and a pivotable and/or rotatable portion.

3. The set of scales of claim 1, wherein a conveying means, in particular a conveyor belt, is disposed on the frame of each of the weighing tables.

4. The set of scales of claim 3, wherein the frame of each of the weighing tables in the use position thereof tensions the conveyor belt, and the conveyor belt in the cleaning position of the frame of each of the weighing tables is not tensioned.

5. The set of scales of claim 4, wherein the conveyor belt in the cleaning position is removable from the frame.

6. The set of scales of claim 1, wherein the frame of each of the weighing tables is provided so as to be partially removable.

7. The set of scales of claim 1, wherein the frame of each of the weighing tables comprises a fixed portion that is fixed to the rack, and a pivotable portion that is pivotable and/or rotatable in relation to the rack and the fixed portion,
wherein a length of the pivotable portion is longer than a length of the fixed portion.

8. The set of scales of claim 7, wherein in the use position, the pivotable portion of one frame is located immediately adjacent to the fixed portion of an adjacent frame.

9. The set of scales of claim 7, wherein the mounting is connected to both of the rack and the fixed portion of each frame, and
wherein the mounting is provided on only one side of the fixed portion of the frame so that an opposing side of the fixed portion of the frame is free of any mountings.

10. The set of scales of claim 9, wherein the mounting is configured to prevent the fixed portion of the frame from moving or pivoting relative to the rack.

11. The set of scales of claim 1, wherein the frame of each of the weighing tables comprises a fixed portion that is fixed to the rack, the mounting is connected to both of the rack and the fixed portion,
wherein the mounting comprises two mountings that are each connected to the rack and the fixed portion, the two mountings are configured to fix the fixed portion to the rack and to prevent the fixed portion from pivoting or rotating relative to the rack.

12. The set of scales of claim 11, wherein the two mountings are provided on only one side of the fixed portion of the frame so that an opposing side of the fixed portion of the frame is free of any mountings.

13. The set of scales of claim 11, wherein in the use position, the pivotable portion is supported on the rack in between a pair of supports that project upwardly from a top surface of the rack.

14. The set of scales of claim 1, wherein each of the weighing tables have an upstream end and an opposing downstream end,
wherein in the use position, the upstream end of one of the weighing tables is located immediately adjacent the upstream end of an adjacent one of the weighing tables, and
wherein in the cleaning position, the upstream end of one of the weighing tables is located immediately adjacent to the downstream end of the adjacent one of the weighing tables.

15. The set of scales of claim 14, wherein a conveyor belt is disposed on the frame of each of the weighing tables,
wherein in the cleaning position, a passage is defined between the upstream end of one of the weighing tables and the downstream end of the adjacent one of the weighing tables, and
wherein the passage extends along a length of the rack in a direction transverse to a conveying direction of the conveyor belt.

16. An assembly comprising:
a rack;
a plurality of weighing tables located on the rack, each of the weighing tables comprises a frame, the frame comprises a fixed portion and a pivoting portion;
wherein a length of the pivoting portion is longer than a length of the fixed portion;
wherein the pivoting portion is pivotable between a use position and a cleaning position,
wherein each of the weighing tables have an upstream end and an opposing downstream end,
wherein in the use position, the upstream end of one of the weighing tables is located immediately adjacent the upstream end of an adjacent one of the weighing tables, and
wherein in the cleaning position, the upstream end of one of the weighing tables is located immediately adjacent the downstream end of the adjacent one of the weighing tables.

17. The assembly according to claim 16, wherein in the use position, the pivoting portion of one frame is located immediately adjacent to the fixed portion of another frame.

18. The assembly according to claim 16, wherein one side of the fixed portion of the frame is fixed to the rack by way of two mounts, and an opposing side of the fixed portion of the frame is free of any mounts connecting the fixed portion to the frame, and
wherein the two mountings are configured to fix the fixed portion to the rack and prevent the fixed portion from pivoting or rotating relative to the rack.

19. The assembly according to claim 16, wherein a conveyor belt is disposed on the frame of each of the weighing tables,
wherein in the cleaning position, a passage is defined between the upstream end of one of the weighing tables and the downstream end of the adjacent one of the weighing tables, and
wherein the passage extends along a length of the rack in a direction transverse to a conveying direction of the conveyor belt.

20. An assembly comprising:

a rack;

a plurality of weighing tables located on the rack, each of the weighing tables comprise a frame comprising a fixed portion and a pivoting portion;

wherein a length of the pivoting portion is longer than a length of the fixed portion;

wherein the pivoting portion is pivotable between a use position and a cleaning position, wherein each of the weighing tables have an upstream end and an opposing downstream end, wherein in the use position, the upstream end of one of the weighing tables is located immediately adjacent to the upstream end of an adjacent one of the weighing tables, wherein in the cleaning position, the upstream end of one of the weighing tables is located immediately adjacent the downstream end of the adjacent one of the weighing tables;

wherein in the use position, the pivoting portion of one of the weighing tables is located immediately adjacent the fixed portion of the adjacent one of the weighing tables;

wherein one side of the fixed portion of the frame is fixed to the rack by way of two mounts, and an opposing side of the fixed portion of the frame is free of any mounts connecting the fixed portion to the frame, the two mountings are configured to prevent the fixed portion from pivoting or rotating relative to the rack;

wherein a conveyor belt is disposed on the frame of each of the weighing tables, wherein in the cleaning position, a passage is defined between the upstream end of one of the weighing tables and the downstream end of the adjacent one of the weighing tables, and wherein the passage extends along a length of the rack in a direction transverse to a conveying direction of the conveyor belt.

* * * * *